United States Patent [19]

Crafts

[11] 3,786,456

[45] Jan. 15, 1974

[54] VARIABLE RATE INCREMENTING RECORDER

[75] Inventor: Robert L. Crafts, Tulsa, Okla.

[73] Assignee: Telex Computer Products Inc., Tulsa, Okla.

[22] Filed: June 13, 1972

[21] Appl. No.: 262,242

[52] U.S. Cl. ........... 340/174.1 A, 226/120, 242/206

[51] Int. Cl. ........................................ G11b 15/18

[58] Field of Search .............. 340/174.1 A, 174.1 G, 340/174.1 H; 242/206, 210; 226/120, 126, 152, 157

[56] References Cited

UNITED STATES PATENTS

| | | | |
|---|---|---|---|
| 3,275,208 | 9/1966 | Poumekis | 340/174.1 A |
| 3,465,128 | 9/1969 | Poumekis | 340/174.1 A |
| 3,332,084 | 7/1967 | Wahrer et al. | 340/174.1 A |
| 3,454,930 | 7/1969 | Schoeneman | 340/174.1 A |
| 3,465,349 | 9/1969 | Schoeneman | 340/174.1 A |
| 3,474,429 | 10/1969 | McCowen | 340/174.1 A |
| 3,631,427 | 12/1971 | Hein | 340/174.1 A |
| 3,576,584 | 4/1971 | Cone | 340/174.1 A |
| 3,595,499 | 7/1971 | Crafts | 340/174.1 A |

*Primary Examiner*—Vincent P. Canney
*Attorney*—James R. Head et al.

[57] ABSTRACT

This invention describes an improved type of incremental recording magnetic data system in which data can be recorded in response to the arrival of specific data characters, the tape being idle in between the times of such arrivals. The equipment is similar in some respects to the U. S. Pat. No. 3,595,499, granted to Robert L. Crafts, issued July 27, 1971, entitled APPARATUS FOR MOVING TAPE INCREMENTALLY PAST A RECORDING HEAD.

This invention covers an improvement over the Crafts patent in that while it still provides the opportunity to record data incrementally, it provides an additional advantage that the rate of playback of the data can be adjusted to any desired rate from zero up to the maximum rate of traverse of the tape.

5 Claims, 4 Drawing Figures

VARIABLE RATE INCREMENTING RECORDER

CROSS REFERENCES TO RELATED APPLICATIONS

This application is related to the U.S. Pat. No. 3,595,499, granted to Robert L. Crafts July 27, 1971, entitled: APPARATUS FOR MOVING TAPE INCREMENTALLY PAST A RECORDING HEAD. It is related also to a copending application in the name of Richard S. Anderson, et al, Ser. No. 69,036, filed Sept. 2, 1970, entitled: MEANS FOR RECORDING MULTI-BIT CHARACTER DATA. Applicant Crafts is a co-inventor of Ser. No. 69,036.

BACKGROUND AND OBJECTS OF THE INVENTION

Magnetic tape systems are frequently used today to store data for subsequent use. A tape data storage system consists basically of a magnetic tape, record and playback heads, or a combination record-playback head, and means of moving the tape past the record-playback head. A typical system includes the arrangement wherein the tape is moved by a rotating capstan against which the tape is pressed, such as by means of a pinch roller. As long as the capstan is rotating the tape is moved past the recording head.

It is sometimes necessary to store data on a tape in which the data are not presented at a continuous rate, such as when the data are in the form of time-spaced multibit character signals. A continuously moving tape results in much of the tape not being used for data storage since much tape travel occurs between the receipt of individual data characters. When the tape is played back, there may also be a substantial time loss, and the length of tape necessary to record and playback a given amount of data will, in such cases, be excessive.

This invention provides an incremental recording apparatus utilized to record and playback data in either digital or analog form. The invention is particularly useful in recording data signals received in multibit form such as those generated by a teletypewriter or similar device. These signals are typically generated in serial or parallel groups of bits to form individual characters. The recorder to be described includes arrangement for recording such data in incremental form, one increment of tape moving for each character recorded (each character represented by a plurality of serial bits) with the tape remaining stationary during the interval between recording increments.

There is an important problem associated with the design of equipment of this sort and that is concerned with the rate of playback of the data. Since there is not continuous recording of the data but only incremental recording, some means must be provided to properly space the individual multibit characters along the tape. This is provided in the Crafts patent by the ratchet. In playback there may be a plurality of desired rates, and heretofore, in the prior art, it was necessary to know in advance of recording, what the desired playback rate would be so that the placement of the individual data characters on the tape would be spaced such that at the desired playback rate there would be continuous delivery of data characters. This problem was understood and has been described and a solution provided in the Anderson et al application. This application provides an improved method of recording the incremental data and of playing back the data at any desired rate of playback.

It is therefore an object of this invention to provide an incremental tape recording apparatus.

More particularly, an object of this invention is to provide an incremental recording apparatus for moving the tape past a recording head for recording data thereon, the tape being moved in incremental steps.

There is a still more particular object of this invention to provide a means of recording data as it is provided to the recorder and of playing back the same data at any desired rate from zero to the maximum playback rate of the device.

These objects, as well as other objects of the invention, will be understood by reference to the description and claims taken in conjunction with the appended drawings, in which:

DESCRIPTION OF THE VIEWS

DESCRIPTION OF THE PREFERRED EMBODIMENT

Figures 1, 2, 3, 4:
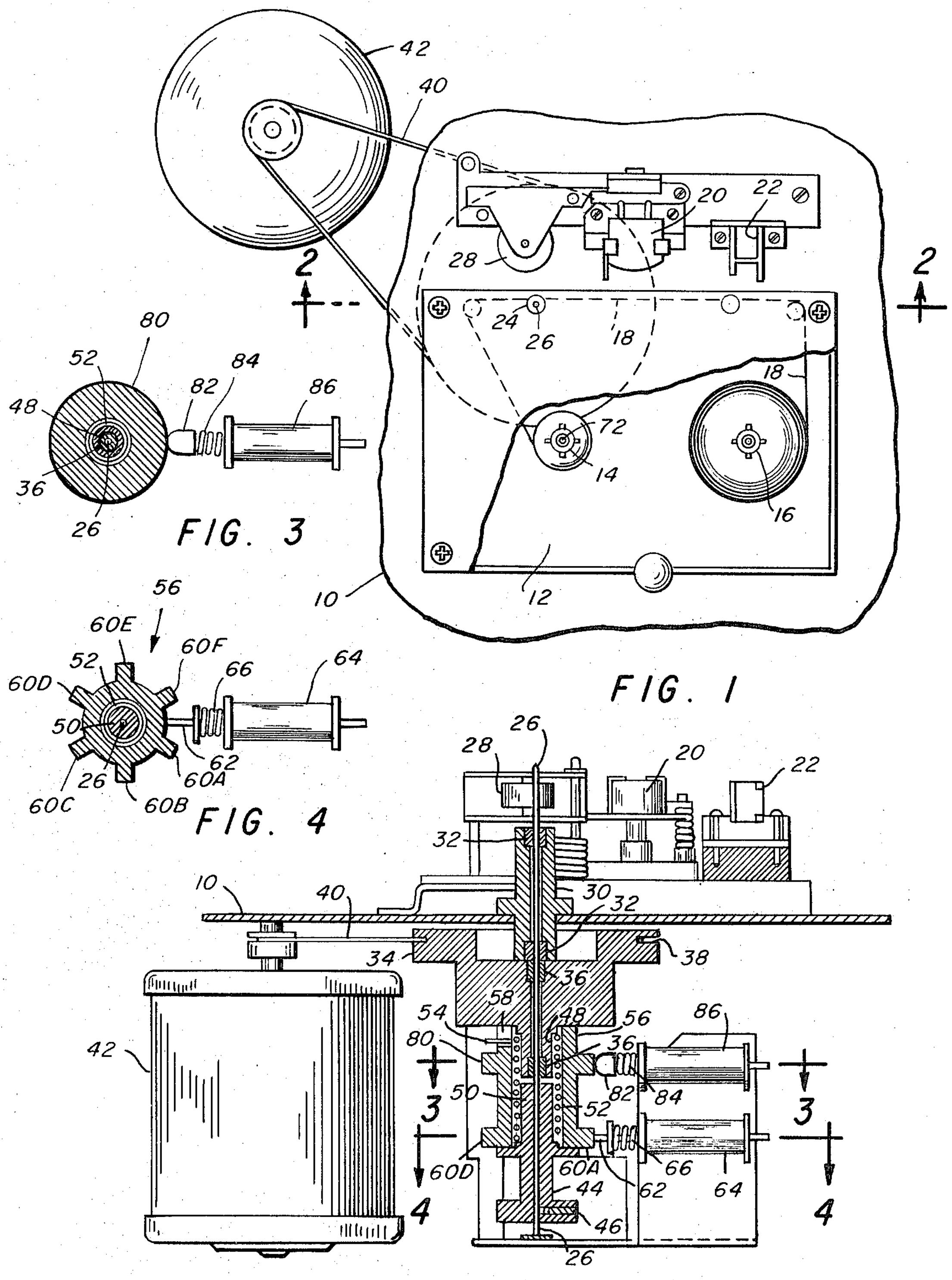
FIG. 1 is a top view of a portion of a tape recording apparatus.
FIG. 2 is a cross-sectional view taken along the line 2—2 of FIG. 1, disclosing the details of the incremental tape recording apparatus of this invention.
FIG. 3 is a cross-sectional view taken along the line 3—3 of FIG. 2.
FIG. 4 is a cross-sectional view taken along the line 4—4 of FIG. 2.

Referring to the drawing, and first to FIGS. 1 and 2, the numeral 10 indicates a base plate upon which the major portion of the elements making up the invention are supported. The base plate 10 includes means to receive a tape cassette 12 thereon, the cassette being of standard design well known in the industry. The tape cassette 12 includes a wind spool 14 and a rewind spool 16 which receive a magnetic tape 18 thereon.

Positioned on the base plate 10 is a record-playback head 20 which, when the mechanism is in the operating mode, is in contact with magnetic tape 18. A guide 22 insures proper alignment of tape 18 with head 20. An opening 24 in cassette 12 receives a capstan shaft 26 against which tape 18 is pressed by means of a pinch roller 28. The rotation of capstan shaft 26 causes movement of the tape 18 past record-playback head 20 when the apparatus is in record or playback mode. The mechanism shown in FIG. 1 is not unlike that of a typical cassette-type tape recorder in which capstan shaft 26 is continuously rotated in the record mode to move tape 18 past head 20.

FIG. 2 shows details of the invention including means whereby the capstan shaft 26, rather than being rotated continuously as in the typical tape recorder, is rotated incrementally so that tape 18 is moved as data, in multibit character form, are actually recorded. FIG. 2 is shown without the cassette 12. A bearing block 30 having an opening therethrough and a bearing 32 at each end is affixed to the base plate 10 and rotatably supports the capstan shaft 26. A flywheel 34 is rotatably supported on the capstan shaft 26 and having bearings 36, which insure low-frictional relationship between the flywheel 34 and the shaft 26. Flywheel 34 includes a groove 38 in the exterior periphery which receives a belt 40 driven by motor 42. When motor 42 is energized flywheel 34 rotates continuously about the capstan shaft 26.

Affixed to the capstan shaft 26 is a drive collar 44 held to the shaft by setscrew 46. Flywheel 34 includes an integral reduced diameter shoulder portion 48 at one end, and in like manner the drive collar 44 includes a reduced diameter shoulder portion 50 at the end adjacent the flywheel. The shoulder portions 48 and 50 are of approximately the same external diameter and both are coaxial about shaft 26. In the preferred arrangement the diameter of shoulder portion 50 is 0.001 inch to 0.003 inch larger than the diameter of shoulder portion 48.

Positioned on shoulder portions 48 and 50 is a coiled spring 52. The spring 52 has, at the end thereof adjacent the flywheel 34, a radially extending tang portion 54. The spring 52 is coiled in the direction such that the rotation of flywheel 34 tends to wrap the spring more tightly about the shoulder portion 48 of the flywheel and shoulder portion 50 of the drive collar. Spring 52 has a normal internal diameter slightly less than the external diameter of the shoulder portions 48 and 50 so that frictional relationship between these components normally exist.

Received about spring 52 is a tubular ratchet member 56, the interior diameter of the ratchet member being slightly larger than the exterior diameter of spring 52. A notch 58 in the ratchet member receives the tang 54 of spring 52.

The exterior of ratchet member 56 has at least one integral radial tooth portion extending from the exterior circumferential surface. In the illustrated arrangement there are six of such teeth 60A, 60B . . . 60F, spaced 60° relative to each other on the ratchet member circumferential surface. (See FIG. 4). Supported adjacent the ratchet member 56 is a movable ratchet release bar. In the illustrated arrangement the ratchet release bar is in the form of a plunger 62 of a solenoid 64. A spring 66 normally retains the ratchet release bar, or plunger 62, in position to engage teeth 60 as the ratchet member 56 rotates, the plunger 62 being withdrawn and out of contact when solenoid 64 is energized.

DESCRIPTION OF OPERATION

When the apparatus is in the record mode tape cassette 12 is positioned such that magnetic tape 18 engages recording head 20 and is held against capstan shaft 26 by the pinch roller 28. Data, such as in the form of teletypewriter transmission, may be incrementally recorded and the use of the apparatus for such purpose will now be described, it being understood that the invention is not limited only to use for this purpose. Each character coming out of the standard teletypewriter transmission system is approximateky 100 milliseconds long with individual code bits equally spaced. Each teletypewriter character includes a start bit, seven character bits, a parity bit, and two stop bits. By circuity which is not a part of this invention, the start bit of each character energizes solenoid 64, withdrawing plunger 62. Continuously rotating flywheel 34 transmits frictional torque to spring 52 which is normally held in nonrotated condition by ratchet 56. When tooth 60A of ratchet 56 is released by the withdrawal of plunger 62, spring 52 immediately tightens about shoulder 48 of the flywheel and shoulder 50 of the drive collar, transmitting rotational torque to drive collar 44, and capstan shaft 26 is rotated. Drive collar 44 continues to rotate until ratchet 56 is stopped. Solenoid 64 is energized by the start bit of the character to be received only for a length of time sufficient to allow tooth 60B on the ratchet member 56 to pass, and plunger 62 immediately returns to its extended position. Thus, the ratchet member 56 will rotate until the next tooth 60B strikes plunger 62. When each of the six teeth, 60A to 60F are utilized individually, as shown in FIG. 4, ratchet member 56 and thereby capstan shaft 26, will rotate 60°. During this 60° rotation of capstan shaft 26, the tape 18 is advanced a length equal to one-sixth the circumference of the capstan shaft 26 at the position at which it is engaged by the tape. This incremental advancement permits the subsequent character bits of the teletypewriter character to be recorded on tape 18. The tape then stops and remains in the stopped position until the next character is received, the first bit of which is the start bit, which results in the function being repeated. In this manner the tape is incrementally advanced only during receipt and recording of a character.

DESCRIPTION OF THE IMPROVEMENTS

What has been described so far is substantially similar to the corresponding information in the Crafts U.S. Pat. No. 3,595,499 of which this application is an improvement. The improvement lies in the ability to playback the tape recorded in accordance with the preceding description of operation, at any desired rate. Referring to FIG. 3 it is seen that the ratchet member 56 in addition to ratchet teeth 60 has a circular cylindrical surface, or rim 80 coaxial with the ratchet member 56. The outer surface of this rim 80 is a friction surface and there is in contact with that surface a plunger 82 which is attached to a rod and to a magnetic core, which can be withdrawn by means of the solenoid 86. When current is applied to the solenoid 86 the plunger 82 is withdrawn out of contact with the rim 80 and when current is stopped the spring 84 again thrusts the plunger 82 into frictional contact with the rim 80, and holds it in fixed position.

In the recording process the ratchet wheel shown in FIG. 4 permits the tape to be moved and stopped each time the ratchet rotates the angle of 60°. Depending on the geometry of the capstan shaft, etc., this represents a certain minimum spacing along the magnetic tape. If a greater spacing is desired between the individual data characters, the ratchet can be operated so that it can be stopped every second ratchet tooth. In such case the tape moves twice the minimum distance before it stops and one data character then occupies a longer space on the tape. Similarly, two, three, four, or five ratchet teeth can be passed for each data character so that the rate of data recorded on the tape can be varied. This is the feature utilized in the application Ser. No. 69,036, for adjusting the rate of playback, when the playback drive is set for a constant tape speed.

The friction rim 80 and the plunger 82 provide a start-stop mechanism similar to that of the ratchet. Through means not shown but explained fully in the application Ser. No. 69,036, which is made a part of this application by reference, means are provided such that when the read-head, which reads the data as the tape advances, has completed a data word, it sends a signal to the solenoid 86 to release the plunger and to stop the tape. This is done by stopping the ratchet member and releasing the torque of the spring against the flywheel. When the next data character is required a corresponding signal is set to the solenoid 86 to pull the plunger 82 back and to permit the ratchet member to rotate and thus to tighten the spring clutch around the flywheel and to drive the capstan until again the signal is received by the solenoid to release the plunger and stop the ratchet member and thus the capstan shaft. By this means a signal is provided to the solenoid 86 each time a data character is to be read and the capstan member is rotated and stopped through an angle just sufficient to read one data character. The logic system, such as a computer or tape unit controller, that requires the data to be read out provides the signals to the solenoid 86, so that corresponding data characters can be read off the tape at the desired rate. The operation of the solenoid 86 and plunger 82 is at least as rapid as the ability of the ratchet member to start and stop after a single data character has passed so that it is possible at the maximum speed of playback to operate this drive system on a stop-and-go basis, providing a read signal to start the capstan, and a stop signal to stop the capstan after each data character has been read. It is therefore seen that the start signals can come at any desired time interval, up to the maximum speed of operation of the device.

It is therefore not necessary to know in advance of recording what the playback rate will be. It is recorded generally at the maximum rate, that is, the closest spacing of the data characters along the tape and the playback then is controlled by the logic system that is utilizing the data. Both the ratchet member 56 and the rim 80 are similar devices when used in conjunction with the plungers 62 and 82 respectively. However, there is one important difference and that is that the ratchet member is self-indexing, in that once the plunger 62 is pulled back the ratchet member will rotate a measured angle before it stops. On the other hand, the plunger 82 when it is once pulled back can be released at any time so that it has no way of predetermining a fixed spacing along the tape but is a true slave to the logic system using the data.

While the operation of the plunger 82 and the solenoid 86 requires the use of electronic means tied to the reading head and other logic, and while this has not been described in this application, it is fully described in the copending application Ser. No. 69,036, and those parts of that application which pertains to this matter are entered into this application by reference and need not be described further.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. Apparatus for recording, at selectively spaced positions on a tape, data characters, which arrive at irregular spaced time intervals, and for playing back said data characters at any selected rate up to the maximum speed of the tape, comprising:

a. a capstan shaft against which said tape is pressed;

b. a continuously rotating flywheel;

c. electrically controlled first clutch means responsive to the arrival of each data character for engaging said first clutch and operatively connecting said flywheel and said capstan shaft for a selected time interval and traversing said tape a selected increment of length;

d. a write head past which said tape is moved by said capstan, a data character being recorded in each selected incremental length of tape;

e. means for rewinding said tape;

f. electrically controlled second clutch means responsive to signal from a device using the reproduced data from said tapes for engaging said second clutch means and operatively connecting said flywheel and said capstan shaft through an element common to both of said first and second clutch means and advancing said tape past a read head; and g. means responsive to the reading of the data character on the tape to disengage said second clutch and stop said tape.

2. Apparatus for recording, at selectively spaced positions on a tape, data characters, which arrive at irregular spaced time intervals, and for playing back said data characters at any selected rate up to the maximum speed of the tape, comprising:

a. a capstan shaft against which said tape is pressed;

b. a continuously rotating flywheel;

c. electrically controlled first clutch means responsive to the arrival of each character for engaging said first clutch and operatively connecting said flywheel and said capstan shaft for a selected time interval and traversing said tape a selected increment of length;

d. a write head past which said tape is moved by said capstan, a data character being recorded in each selected incremental length of tape;

e. means for rewinding said tape;

f. electrically controlled second clutch means responsive to signal from a device using the reproduced data from said tapes for engaging said second clutch means and operatively connecting said flywheel and said capstan shaft and advancing said tape past a read head;

g. means responsive to the reading of the data character on the tape to disengage said second clutch and stop said tape;

h. helical spring means for driving said capstan from said flywheel;

i. ratchet means for engaging and disengaging said spring means to and from said flywheel; and j. electromagnetically operated plunger means to control said ratchet means.

3. The apparatus as in claim 2 in which said ratchet means provides means to engage said spring means to said flywheel for successive intervals of time of a preselected duration.

4. Apparatus for recirding, at selectively spaced positions on a tape, data characters, which arrive at irregular spaced time intervals, and for playing back said data characters at any selected rate up to the maximum speed of the tape, comprising:

a. a capstan shaft against which said tape is pressed;

b. a continuously rotating flywheel;

c. electrically controlled first clutch means responsive to the arrival of each data character for engaging said first clutch and operatively connecting said flywheel and said capstan shaft for a selected time interval and traversing said tape a selected increment of length;

d. a write head past which said tape is moved by said capstan, a data character being recorded in each selected incremental length of tape;

e. means for rewinding said tape;

f. electrically controlled second clutch means responsive to signal from a device using the reproduced data from said tapes for engaging said second clutch means and operatively connecting said flywheel and said capstan shaft and advancing said tape past a read head;

g. means responsive to the reading of the data character on the tape to disengage said second clutch and stop said tape;

h. helical spring means for driving said capstan from said flywheel;

i. friction rim means for engaging and disengaging said spring means to and from said flywheel;

j. frictional plunger means in operative relation to restrain and to release said friction rim; and k. electromagnetically operated means to control said frictional plunger.

5. The apparatus as in claim 4 in which said helical spring means is permanently in torque transmitting connection to said capstan at one end, and is connected to said friction rim at its second end, said spring placed in torque transmitting connection to said flywheel when said friction rim is released, and is removed from torque transmitting connection when said friction rim is clamped by said frictional plunger.

* * * * *